United States Patent
Smith et al.

(10) Patent No.: US 10,355,916 B2
(45) Date of Patent: Jul. 16, 2019

(54) SURVIVABLE NETWORKS THAT USE OPPORTUNISTIC DEVICES TO OFFLOAD SERVICES

(71) Applicant: McAfee, Inc., Santa Clara, CA (US)

(72) Inventors: Ned Smith, Beaverton, OR (US); Thiago Macieira, Portland, OR (US); Zheng Zhang, Portland, OR (US); Glen J. Anderson, Beaverton, OR (US); Tobias Kohlenberg, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 196 days.

(21) Appl. No.: 15/277,874

(22) Filed: Sep. 27, 2016

(65) Prior Publication Data

US 2018/0091361 A1    Mar. 29, 2018

(51) Int. Cl.
*G01R 31/08* (2006.01)
*G06F 11/00* (2006.01)
(Continued)

(52) U.S. Cl.
CPC ........ *H04L 41/0668* (2013.01); *H04L 63/08* (2013.01); *H04L 63/104* (2013.01); *H04L 67/12* (2013.01); *H04L 67/16* (2013.01)

(58) Field of Classification Search
CPC ... H04L 41/0668; H04L 63/08; H04L 63/104; H04L 67/12
See application file for complete search history.

(56) References Cited

U.S. PATENT DOCUMENTS

2011/0117903 A1* 5/2011 Bradley .............. H04M 1/6075
455/418
2012/0157089 A1* 6/2012 Yang .................. H04L 41/0645
455/424
(Continued)

FOREIGN PATENT DOCUMENTS

EP          2835995 A1    2/2015
WO     2014204968 A1    12/2014

OTHER PUBLICATIONS

The International Search Report and the Written Opinion of the International Searching Authority, dated Dec. 7, 2017, 13 pages.

*Primary Examiner* — Stephen M D Agosta
(74) *Attorney, Agent, or Firm* — Hanley, Flight and Zimmerman, LLC

(57) ABSTRACT

Dynamically identifying and utilizing an opportunistic device by performing at least the following within a discovery offloading module: receive an offloading alert message from a service device, wherein the offloading alert message indicates the service device is unable to provide one or more services to the client device, receive a discovery message from a candidate device, wherein the discovery message indicates the candidate device is capable of performing the services provided to the client device, select, using the dedicated execution environment, an opportunistic service device based on the discovery message from the candidate device; and trigger the restart of host execution instruction within the client device by obtaining the one or more services from the opportunistic service device, wherein the discovery offloading module operates independently from the host execution instructions within the client device.

17 Claims, 7 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 12/24* (2006.01)
*H04L 29/06* (2006.01)
*H04L 29/08* (2006.01)

(56) References Cited

U.S. PATENT DOCUMENTS

| | | |
|---|---|---|
| 2013/0034082 A1 | 2/2013 | Etemad et al. |
| 2013/0301607 A1 | 11/2013 | McCann et al. |
| 2014/0003262 A1 | 1/2014 | He et al. |
| 2014/0006776 A1* | 1/2014 | Scott-Nash ............ G06F 21/57 713/156 |
| 2014/0372624 A1* | 12/2014 | Wang ..................... H04L 65/60 709/231 |

* cited by examiner

SURVIVABLE NETWORKS THAT USE OPPORTUNISTIC DEVICES TO OFFLOAD SERVICES

TECHNICAL FIELD

Embodiments described herein generally relate to implementing a resilient network system that dynamically identifies backup nodes to process service requests, and in particular for identifying and utilizing one or more opportunistic devices when a service device fails within an Internet of Things (IoTs) based network.

BACKGROUND ART

Modern data and computer networks comprise a variety of devices adapted to collect, exchange, and process data information. Some of these data and computer networks can be generally referred to as IoT networks that each comprise a plurality of physical objects that operate as electronic-based devices. Specifically, each physical object includes electronic components configured to collect, exchange, and process data information. To collect, exchange, and process data information over an IoT network, the electronic components typically comprise embedded computing hardware and software components, such as microcontrollers, control computing modules, network connectivity, firmware, and/or sensors. The electronic components may also associate each of the physical objects with a unique identifier (e.g., an Internet Protocol (IP) address) such that the physical objects are able to communicate with other devices. Based on the data information, the physical objects may automatically compute, respond, and/or perform tasks without direct human interaction (e.g., performing auto-piloting functions for a vehicle). Examples of physical objects that can communicate within an IoT network include, but are not limited to, mobile devices, wearable devices, automated devices, and/or control and sensory systems.

IoT networks often consist of a mix of mobile and stationary devices that range in complexity. For example, an IoT network may include a relatively constrained device (e.g., a wearable device) with limited computing resources and a limited number of sensors to implement a limited number of control operations. Additionally, the IoT network may include a relatively more sophisticated device that has a vast array of sensors capable of implementing numerous control operations (e.g., a self-driving vehicle). In some instances, network administrators of IoT networks may not have pre-provisioned or designated a backup service device for a variety of reasons, such as operating cost, lack of computing resources, and/or relatively low predicted failure rates. Depending on the application of the IoT network, failure of the service device and subsequently being unable to identify a backup and/or redundant service device may cause harm to not only end users of local devices, but potentially to bystanders in proximity to the end users. For instance, an IoT network may utilize a location beacon device to triangulate positions for one or more local devices, such as a drone, self-driving vehicle, and/or automated transporter that carries toxic substances (e.g., pesticides and herbicides). Failure of the location beacon device and then being unable to locate and utilize a backup service device to provide location information could cause accidents and/or other detrimental events for the end users and/or bystanders. As such, improving technology that identify and utilize opportunistic devices to process service requests within a network may be beneficial in creating a more resilient and reliable network.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
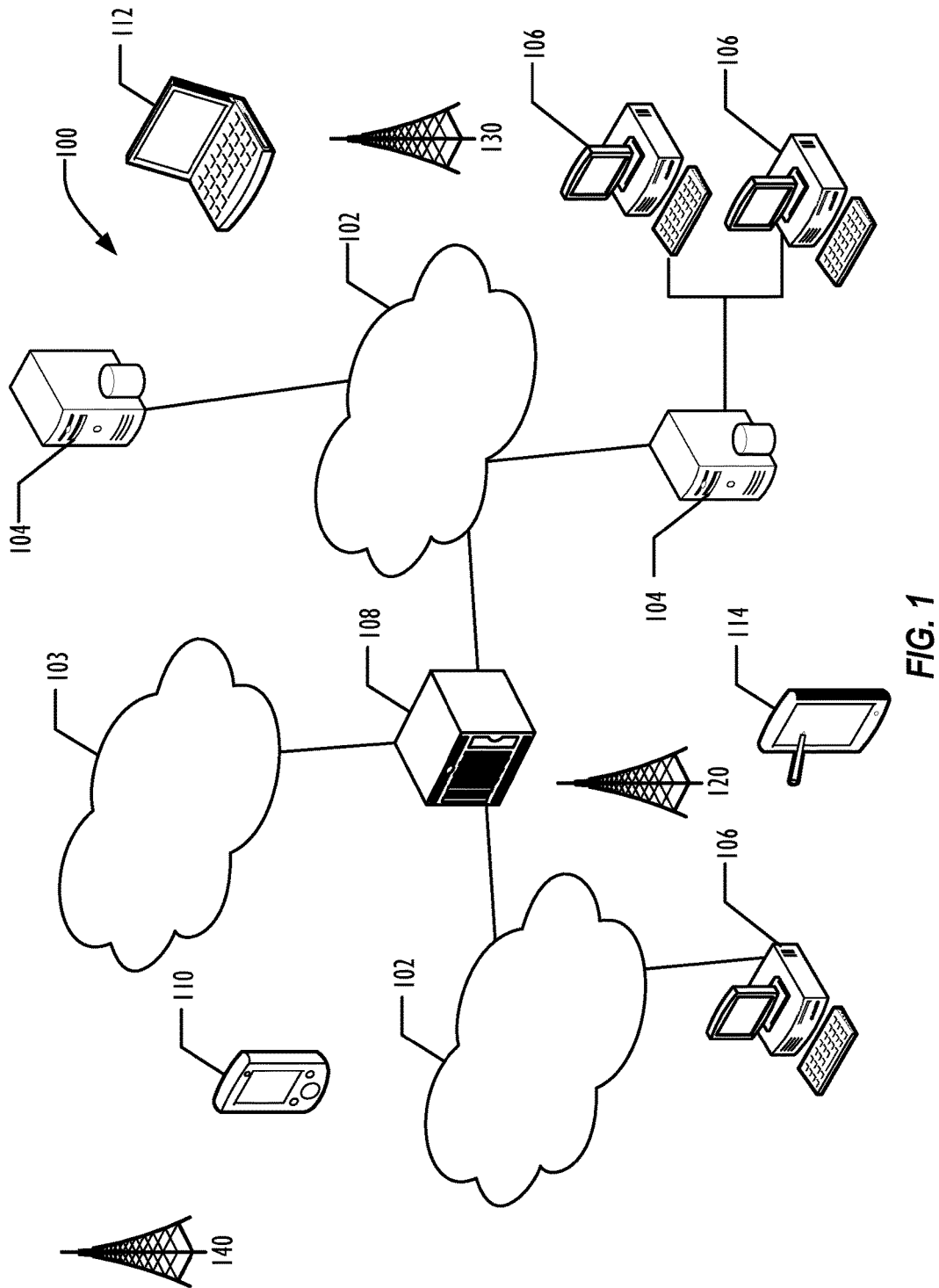
FIG. 1 is a schematic diagram of an embodiment of a network infrastructure where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single computing device that includes, but is not limited to, a mobile device, computer, host, virtual machine (VM), container, tenant, server, and/or network device, or to a plurality of computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "device" refers to a physical object that includes electronic components configured to receive, transmit, and/or process data information. In one embodiment, one or more of the electronic components may be embedded within the physical object, such as in wearable devices and mobile devices (e.g., self-driving vehicles). In one or more embodiments, the device may also include actuators, motors, control functions, sensors, and/or other components to perform one or more tasks without human intervention, such as drones, self-driving vehicles, and/or automated transporters.

As used herein, the term "wearable device" refers to a physical object worn by a user and includes electronic components configured to transmit and/or receive data over one or more communication environments (e.g., a computer network) and/or one or more connection links (e.g., a universal serial bus (USB) interface). Example embodiments of wearable devices include, but are not limited to smart wristbands that track user activity, smartwatches, smart eyewear, and wearable medical devices. Unless otherwise specified term "wearable device" may be interchanged and considered synonymous throughout this disclosure to the terms "wearable technology," "wearable device," and/or "wearables."

As used herein, the term "execution instruction" refers to a computing program, process, stub, code, workload, thread, and/or any other type of computing instruction related to performing a computing related task. Example embodiments of execution instruction include software modules, software objects, firmware (e.g., Basic Input/Output System (BIOS)), and/or other types of executable code.

As used herein, the term "opportunistic service device" refers to a backup and/or redundant device that is capable, and in some instances, available to provide one or more services that a current service device provides to one or more client devices.

As used herein, the term "computing event" refers to any event or occurrence triggered from one or more computing policies associated with hardware, firmware, and/or software. Examples embodiments of computing events include hardware-level events (e.g., branch misprediction) and operating system-level events (e.g., interrupts).

This disclosure includes various example embodiments that dynamically identify and utilize opportunistic service devices. A service device, such as a server, within a network may include a discovery offloading module implemented within a dedicated execution environment that separates and isolates one or more execution instructions from other host-based execution instructions. The discovery offloading module may monitor the service device's computing processes and determine whether an offloading condition, such as a failure, load-balancing, and/or roaming conditions, occurs when the service device attempts to provide services to one or more client devices. When the discovery offloading module detects that an offloading condition occurs, the discovery offloading module may obtain information regarding the service operations and associated context information. Afterwards, the discovery offloading module may transmit an offloading alert message to one or more candidate devices and client devices. The candidate devices may receive the offloading alert message over a dedicated network channel using their own discovery offloading module.

Based on the information within the offloading alert message each candidate devices may determine whether it is available and capable of acting as an opportunistic service devices for one or more client devices. By doing so, client devices are able to minimize the process of repeatedly finding opportunistic service devices and also decrease the likelihood of resource competition at candidate devices.

FIG. 1 is a schematic diagram of an embodiment of a network infrastructure 100 where embodiments of the present disclosure may operate herein. Network infrastructure 100 comprises a plurality of computer networks 102. Each of the computer networks 102 may contain a number of IoT devices that include electronic components (e.g., microcontrollers, embedded systems, industrial control computing modules, etc.). Specifically, computer networks 102 comprise one or more different types of computer networks available today, such as the Internet, enterprise networks, data centers, wide area networks (WANs), and/or local area networks (LANs). Each of these networks within computer networks 102 may contain wired and/or wireless programmable devices that operator in the electrical and/or optical domain, and also employ any number of network communication protocols (e.g., TCP/IP). For example, one or more of the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure.

The networks within computer networks 102 may also comprise switches, routers, and/or other network hardware devices configured to transport data over computer networks 102. Moreover, one or more of the networks within computer networks 102 may be configured to implement computer virtualization, such as virtual private network (VPN) and/or cloud based networking. FIG. 1 illustrates that computer networks 102 may be connected to computers 106, computer servers 104, and one or more network nodes 108, which include, but are not limited to, gateways, routers, and/or wireless access points. The computers 106 and/or computer servers 104 may each comprise a plurality of VMs, containers, and/or other types of virtualized computing systems for processing computing instructions and transmitting and/or receiving data over computer networks 102. The computers 106 and computer server 104 may be configured to support a multi-tenant architecture, where each tenant may implement its own secure and isolated virtual network environment. Although not illustrated in FIG. 1, the network infrastructure 100 may connect computer networks 102 to a variety of other types of computing device, such as VMs, containers, hosts, storage devices, wearable devices, mobile devices (e.g., self-driving vehicle), and/or any other device configured to transmit and/or receive data over computer networks 102. The functionality of the network node 108 may be implemented in any device or combination of devices illustrated in FIG. 1; however, most commonly is implemented in a firewall or intrusion protection system in a gateway or router.

As shown in FIG. 1, network infrastructure 100 may also comprise a cellular network 103 for use with mobile communication devices. The cellular network 103 may be capable of supporting of a variety of devices that include, but are not limited to computers, laptops, and/or a variety of mobile devices (e.g., mobile phones, self-driving vehicles, ships, and drones). Using FIG. 1 as an example, devices in the network infrastructure 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and computer servers 106 for desired services.

In one or more embodiments, one or more mobile devices (e.g., mobile phones 110, laptops 112, and tablets 114), computer servers 104, computers 106, and/or other devices may support trusted operations through the employment of a dedicated execution environment, such as a trusted execution environment (TEE). The mobile phones 110, laptops 112, tablets 114, computer servers 104, computers 106, and/or other devices in network infrastructure 100 that support trusted operations may be referred to as trusted network devices throughout this disclosure. Trusted networks may be formed dynamically using trusted discovery which allows trusted network devices to discover other trusted network devices, or trusted network nodes, that include a trusted entity. For example, a TEE may implemented using Intel® Software Guard Extensions (SGX), Intel® Converged Security Engine (CSE), Intel® Virtualization Technology, Advanced RISC Machines (ARM®) TrustZone®, Hardware Security Module, and/or Intel® Manageability Engine (ME). For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

Using FIG. 1 as an example, one or more mobile devices (e.g., mobile phones 110, laptops 112, and tablets 114), computer servers 104, and/or computers 106, may include a discovery offloading module used to dynamically discover opportunistic service devices to process service requests within computing network 102 and/or cellular network 103. One or more of the mobile devices and/or computers 106 may act as client devices, where each client device may establish at least one connection (e.g., wired and/or wireless connections) with a current service device, such as a computer server 104. The current service device may perform one or more services for each of the client devices. The computing network 102 and/or cellular network 103 may also include candidate devices (e.g., another computer server 104, mobile phone 110, laptop 112, tablet 114, and/or computer 106) that are capable of performing one or more of the services. Candidate devices within computing network 102 and/or cellular network 103 can include the client devices, and/or non-client devices that are not being currently serviced by the current service device.

Each of the current service device, client devices, and/or candidate devices may include discovery offloading modules that advertise, monitor, and/or respond to offload conditions, such as failure, load-balancing, and/or roaming conditions. For example, the current service device may encounter an offload condition that prevents and/or impairs its ability to process services requests received from one or more client devices (e.g., mobile phones 110, laptops 112, tablets 114, and/or computers 106). When the current service device detects the offload condition, the current service device may advertise (e.g., broadcast or multicast) an offloading alert message over an agreed upon communication channels (e.g., Bluetooth® and/or Wi-Fi®) to the client devices and/or candidate devices. In some instances, a daisy chain communication channel may be implemented if one or more client devices and/or candidate devices are unable to communicate with the current service device. The offloading alert message may include data information indicative of service operations (e.g., temperature and/or location services) the current service device performs for the client devices and relevant contextual information regarding the service operations, current service device, and/or the client devices. Examples of contextual information the offloading alert message may include, but are not limited to, urgency of the offloading alert message, volume and/or load required to provide the service, and/or length of time the services may occupy computing resources. Providing contextual information within the offloading alert message may minimize the frequency a client device may need to search for an opportunistic service device. Meanwhile, the discovery offloading module in the candidate device and/or client device may continuously monitor for offloading alert message sent from the current service device's discovery offloading model.

The client devices (e.g., mobile phones 110, laptops 112, tablets 114, and/or computers 106) may subsequently perform one or more offloading actions after receiving an advertised offloading alert message. In one embodiment, one or more of the client devices may determine whether the offloading alert message impacts their connection with the current service device. If the offloading alert message impacts their connection with the current service device, the client devices may halt computing operations that correspond to services the current service device provides. For example, the client devices may be blocked using a network waiting state in response to receiving the offloading alert message. Additionally or alternatively, the offloading alert message may trigger one or more of the client devices to move into an auto-diagnostic mode in an attempt to determine if the cause of the offloading condition originates at its own end. The auto-diagnostic mode may determine whether the client devices have one or more failing components, and/or if the client devices have roamed out of range of the current service device.

The candidate devices (e.g., computer servers 104, mobile phones 110, laptops 112, tablets 114, and/or computers 106) may also receive the advertised offloading alert message and perform one or more offloading actions. The candidate device may first parse through the offloading alert message and evaluate the services and context information to determine whether the candidate device is capable and/or able to support services for one or more of the connected devices. For example, the current service device may perform the services of triangulating location information, providing temperature information from a temperature sensor, and presenting atmospheric pressure data to the client devices. The candidate device may determine from the offloading alert message whether it is capable and available to perform the services for one or more client devices. If the candidate device determines that it is unable and/or unavailable to perform the services, then the candidate device returns back to a monitoring mode to detect for additional offloading alert messages. If the candidate device determines that it is able and/or available to perform the services, then the candidate device may transmit a discovery message advertisement notifying one or more of the client device of its availability to process service requests.

One or more of the client device may receive the discovery message advertisements from one or more candidate devices. After receiving the discovery message, each of the client device, may select one of the candidate devices that transmitted the discovery message advertisements as the opportunistic service device. In one embodiment, the client device may select the same candidate device as the opportunistic service device. Other embodiments may produce results where the client devices select different opportunistic service devices. Each of the client mobile devices may select the opportunistic service device using one or more well-known methods. Examples of selection methods includes, but are not limited to, selecting the opportunistic service device based on the first received discovery message advertisement, the candidate device with the most available processing resource, the candidate device associated with the strongest wireless signal strength, and/or one or more network conditions (e.g., latency and/or bandwidth conditions). If the client devices do not receive discovery message advertisements, the client devices may continue to operate in a monitoring mode to detect for discovery message advertisements until the current service device resumes operations and/or the client devices discovers a suitable opportunistic service device.

Figure 2:
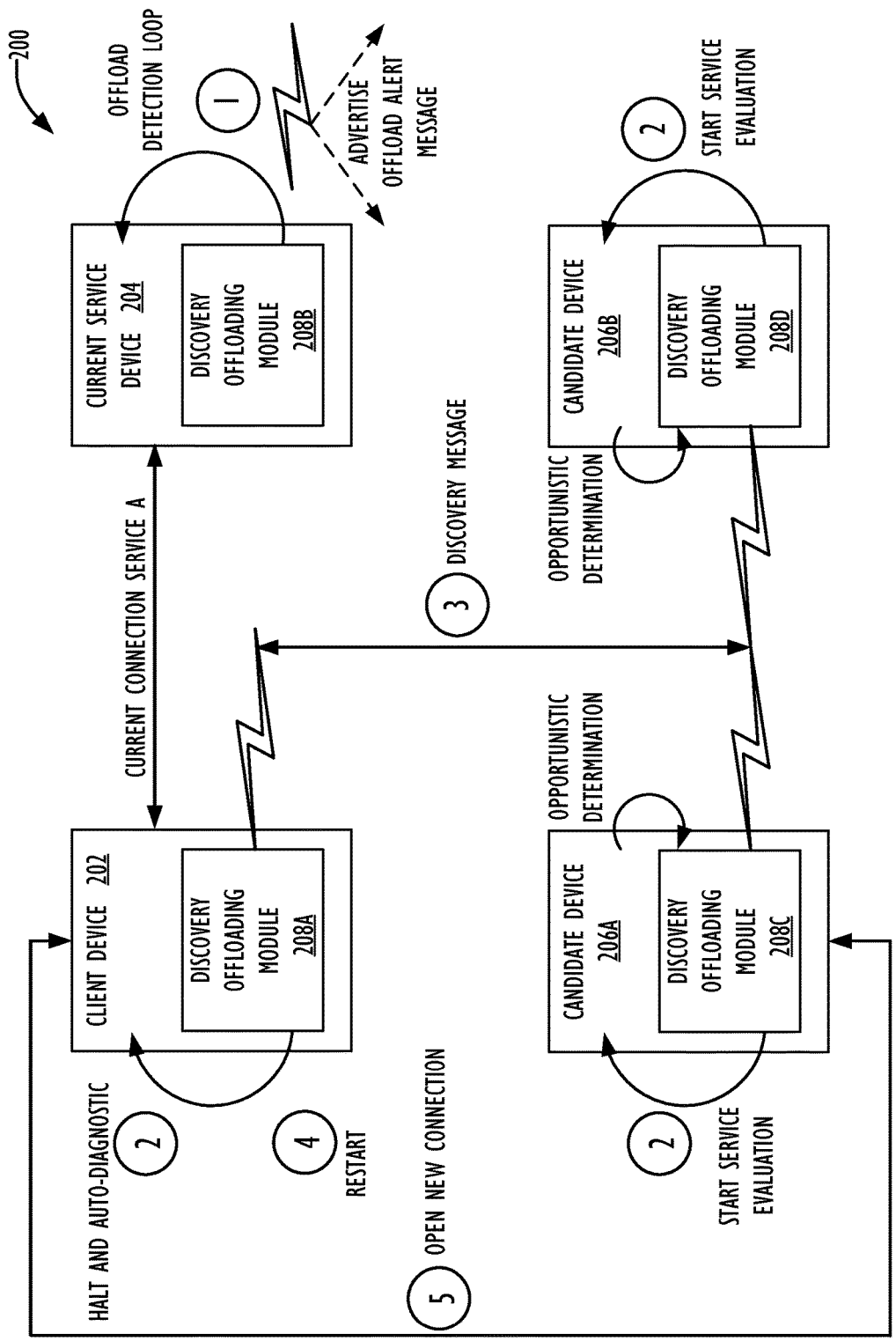
FIG. 2 is a schematic diagram of an embodiment of a computing system configured to dynamically identify one or more opportunistic service devices.

FIG. 2 is a schematic diagram of an embodiment of a computing system 200 configured to dynamically identify one or more opportunistic service devices. FIG. 2 illustrates that the computing system 200 includes a client device 202, a current service device 204, and multiple candidate devices 206A and 206B. Using FIG. 1 as an example, the client device 202 may be implemented using a mobile phone 110, laptop 112, tablet 114, and/or computer 106. The current service device 204 may be a stationary computing system, such as computer server 104 and computer 106, and/or mobile, such as mobile phone 110, laptop 112, and/or tablet 114. Non-limiting examples of the candidate devices 206A and 206B from FIG. 1 could include mobile devices 110, 112, and 114, computers 106, and/or computer server 104. Other embodiments of the client device 202, current service device 204, candidate devices 206A and 206B may include other types of mobile and/or stationary devices, such as self-driving vehicles, ships, and/or drones, capable of connecting to a computer network 102, cellular network 103, and/or other type of telecommunication networks (e.g., satellite based network).

As shown in FIG. 2, the client device 202, the current service device 204, and the multiple candidate devices 206A and 206B contain discovery offloading modules 208A-D. The discovery offloading modules 208A-D may be dedicated execution environments that include execution instructions that are separated, partitioned, and/or isolated from other host executing instructions. In one embodiment, the dedicated execution environments may be a TEE that is implemented using a separate security and management engine, such as Intel's ME and/or secure enclaves, such as Intel's SGX. Other examples of implementing dedicated execution environments include using Intel's CSE, Hidden Lake, Converged Security and Manageability Engine (CSME), System Management Mode (SMM), and Baseboard Management Controller (BMC).

Implementing the discovery offloading modules 208A-D as dedicated execution environments provide additional reliability, robustness, and security by operating independently of host execution instructions. Being isolated from host computing operations allows the discovery offloading modules 208A-D to be relatively less susceptible to computing failures, malware threats, and/or processing throughput issues host executed instructions experience. In other words, the discovery offloading modules 208A-D may be able to perform discovery operations when an offloading condition concurrently occurs, after an offloading condition occurs, and/or immediate preceding when the host computing system (e.g., the current service device 204) becomes completely inoperable. For example, in a power loss situation, a current service device 204 may not have enough electric power to power on and/or start up to perform host execution instructions. By isolating the discovery offloading module 208B from host execution instructions, the current service device 204 is able to advertise the offloading alert message without powering and/or starting up. Instead, the current service device 204 could remain in a power-off state and provide enough electric power to execute instructions within the discovery offloading module 208B and advertise the offloading alert message.

The discovery offloading modules 208A-D may also be configured to mitigate denial-of-service attacks by provisioning the discovery offloading modules 208A-D into a group that utilizes security credentials to authenticate a group of members. Authenticating a group of members prevents trusted group members from attacking fellow group members. For example, an enhanced privacy identifier (EPID) group or some other digital signature scheme that includes a group public key that corresponds to multiple private keys may be used to define a trusted network group. Membership of the trusted network group may be vetted by a responsible entity, such as a central computing system (not shown in FIG. 2), a network administrator, and/or current service device 204. During the discovery and offloading process, the discovery offloading modules 208A-D may exchange messages that are digitally signed using the EPID group private keys. Whenever one of the discovery offloading modules 208A-D receives a message (e.g., offloading alert message) from another discovery offloading modules 208A-D, the receiving discovery offloading modules 208A-D may verify the message using a public key. The discovery offloading modules 208A-D may ignore unauthenticated messages, which avoids denial-of-service attacks.

A network administrator may not pre-provision backup and/or redundant service devices within computing system 200 that assumes responsibility for services that the current service device 204 provides to client device 202. Instead, the network administrator may configure the computing system 200 to dynamically identify opportunistic service devices based on the detection of offloading conditions. As shown in FIG. 2, the discovery offloading module 208B may implement an offload detection loop at step 1 to monitor and detect offloading conditions, such as failure, load-balancing, and/or roaming conditions, at the current service device 204. At step 1, the discovery offloading module 208B may detect for one or more failure conditions, such as loss of power, overheating issues (e.g., processor overheating), tight loop execution, power state changes, and/or failure interrupts. The discovery offloading module 208B may monitor for failure conditions by monitoring hardware level information (e.g., performance counters) and/or other computing events located at higher computer hierarchy levels that correspond to one or more executing computing applications. For example, a variety of failure conditions can occur within the current service device 204 that include, but are not limited to, central processing unit (CPU) failure, system bus failure, and/or one or more sensor component failures. In each of those failures, the current service device 204 may generate a computing event, such as failure interrupts that the discovery offloading module 208B may detect. In one embodiment, the discovery offloading module 208B may continuously monitor the performance counters of the CPUs and/or registers that record computing events to detect for failure conditions.

The discovery offloading module 208B may determine that a loss of power and/or power state changes trigger a failure condition. The discovery offloading module 208B may monitor one or more power related parameters, such as the incoming voltage from a power supply, current readings from one or more internal current sensors, and/or power state changes associated with batteries and other charge storing devices. In one embodiment, the discovery offloading module 208B may detect power failures caused from short circuits by measuring and/or monitoring current using one or more internal current sensors. The discovery offloading module 208B may also monitor a battery charge level and/or a power supply voltage level and compare them with one or more power-based thresholds. For example, if the battery charge level falls below a minimum threshold level (e.g., an undercharging situation) and/or above a maximum threshold value (e.g., an overcharging situation) the discovery offloading module 208B may determine that a failure condition occurs. In another embodiment, the discovery offloading module 208B may monitor for a power supply failure condition (e.g., loss of power) that occurs when the supplied voltage level drops below a power voltage threshold value.

Additionally or alternatively, the discovery offloading module 208B may also detect for load-balancing conditions. To detect load-balancing conditions, the discovery offloading module 208B may monitor the current service device's 204 computing resource utilization and/or network conditions (e.g., bandwidth) to determine whether one or more services may be offloaded to one or more candidate device 206A and 206B. The discovery offloading module 208B may monitor the current service device 204 relating to a variety of processing throughput metrics, such as computing wait and run times, and/or memory capacity. If one or more processing throughput metrics satisfies one or more processing thresholds, the discovery offloading module 208B may determine the occurrence of an offloading condition. The discovery offloading module 208B may also monitor network conditions, such as bandwidth and/or latency, associated with processing service requests from the client device 202. When one or more network conditions fails to satisfy one or more network performance thresholds, then the discovery offloading module 208B may determine that an offloading conditions occurs. The discovery offloading module 208B may implement a variety of well-known methods to monitor computing resource utilization and/or network conditions.

Another offloading condition the discovery offloading module 208B may also detect for are roaming conditions. A network administrator may configure the computing system 200 to accommodate devices that temporary join and leave as the devices move in and out of range of the computing system 200. For example, the current service device 204, client device 202, and/or the candidate devices 206A and 206B may be mobile devices, such as land vehicles, ships, drones, and/or aircrafts. Being mobile devices, the current service device 204, client device 202, and/or the candidate devices 206A and 206B may eventually move to a location that exceeds the range of computing system 200. In one embodiment, the discovery offloading module 208B may monitor its own exact location and/or relative location in reference to the location of the computing system 200 and/or other devices within the computing system 200. The discovery offloading module 208B may determine whether a roaming condition occurs using a verity of well-known methods, such as measuring wireless signal strength, determining the number of loss packets between devices with the computing system 200 (e.g., client device 202), and/or using positioning information from a global positioning system (GPS).

In one or more embodiments, a central computing system (not shown in FIG. 2) may be able to track the number and/or locations of current service device 204 within the computing system 200. The central computing system may dynamically issue a command to the discovery offloading module 208B to generate an offloading condition when the current service device 204 appears to be moving out of range of the computing system 200 and/or if the central computing system decides to improve network resiliency in regards to processing service requests from the client device 202. In some instances, the central computing system may also track the locations of the client device 202 and based on the location of the client device 202 issue a command to the discovery offloading module 208B to generate an offloading condition. For example, although the current service device 204 and the client device 202 are located within the computing system 200, the two devices may be relatively far apart that results in limiting or reducing the ability of the current service device 204 to process service requests from the current client devices 202 (e.g., high latency).

Once the discovery offloading module 208B detects that an offload condition occurs, the discovery offloading module 208B at step 1 can construct and advertise an offloading alert message. Prior to advertising the offloading alert message, the discovery offloading module 208B may obtain workload and/or service related information associated with the current service device 204 and relevant contextual information, such as motion, location, direction, and/or relative position. In one embodiment, the offloading alert message may include the service information and context information, such as urgency of the offloading alert message, volume and/or load required to provide the service (e.g., bandwidth, processing capacity, and sensor range), and/or length of time the services may occupy computing resources. Context information regarding client device 202 may also be included in the offloading alert message. For example, the client device 202 may be described using an information model representation, such as object model definitions, such as JavaScript Object Notation (JSON) Schema, Extensible Markup Language (XML) Schema, Yet Another Next Generation (YANG), and Representational State Transfer (REST)ful Application Program Interface (API) Modeling Language (RAML). In one or more embodiments, the client device 202 may process the schema to obtain the client context information and share it with the current service device 204 and/or candidate devices 206A and 206B. The discovery offloading module 208B may then include the shared client context information when creating the offloading alert message.

In another embodiment, the discovery offloading modules 208A-D may have been previously provisioned into a group (e.g., EPID group) having credentials used to authenticate group members. Rather than encoding the service related information and/or relevant context information within the offloading alert message, the offloading alert message include fields that identify one or more candidate devices and/or pointer information (e.g., memory address index) for retrieving the service related information from a database and/or memory. For example, an offloading alert message for discovery offloading modules 208A-D that were previously provisioned into an EPID group may include: (1) an information model representation of interface definitions and object model definitions, such as JSON Schema, XML Schema, YANG, and RAML; (2) sensor and/or actuator components residing on the platform of the current service device 204; (3) address, location, protocol and/or other information relevant for connecting to the client device 202; (4) group identity corresponding to an EPID group key that is known and may be used to authenticate as a group member; (5) failure reason and/or codes an optionally current status of the of the operation that could not be completed on the current service device 204; and (6) a current subscriber list and credentials used to authenticate subscriber requests or a delegation credential that authorizes the candidate devices 206A and 206B to obtain credentials (e.g., tickets, tokens, certificates) as need to migrate servicing of subscribers to the candidate devices 206A and 206B. Information regarding the sensor and/or actuator components may be generally provided by the information model description, but additional sensor and/or actuator information, such as make, model, version information for each sensor and/or actuator, and the information model aligns to may also be found in other parts of the offloading alert message.

At step 2, the current client device's 202 discovery offloading module 208A may receive the advertised offloading alert message and afterwards the discovery offloading module 208A may determine whether the offloading alert message impacts its connection with the current service device 204. For example, the advertised offloading alert message may indicate that service <A> (e.g., providing temperature data) may need to be moved to an opportunistic service device. If the client device 202 does not request for service <A> from the current service device 204, the advertised offloading alert message may not affect the current client device's 202 connection with the current service device 204. If the advertised offloading alert message does affect the client device 202, the discovery offloading module 208A may proceed to halt computing operations associated with the service <A>. For example, the client device 202 may be blocked on a network waiting state in response to receiving the advertised offloading alert message. The advertised offloading alert message may also trigger the discovery offloading module 208A to instruct the client device 202 to move into an auto-diagnostic mode in an attempt to determine if the client device 202 is the source of the offloading condition. For example, the client device 202 may enter an auto-diagnostic mode to determine that the source of the transmission, such as lost packets failure originates from a failure at the client device 202 and/or if the client device 202 has roamed out of range of the current service device 204.

Also at step 2, the discovery offloading modules 208C and 208D that correspond to candidate devices 206A and 206B, respectively, may receive the advertised offloading alert message and determine whether the candidate devices 206A and 206B are able to become opportunistic service devices. The discovery offloading module 208C and 208D may parse through the offloading alert message and evaluate the services and contextual information to determine whether the candidate devices 206A and 206B are capable and/or able to support services for client device 202. For example, the current service device 204 may perform the services of supplying a location beacon, provide temperature readings, and/or obtaining atmospheric pressure for the client device 202. The candidate devices 206A and 206B may analyze the offloading alert message to determine that these services need to be supplied to the client device 202 and subsequently performs a check to determine if it is capable to perform the services. At step 2, the candidate devices 206A and 206B may check whether they include the sensors that measure the location information, temperature information, and atmospheric pressure information. Additionally or alternatively, the candidate devices 206A and 206B may also check whether it is able to obtain the information from another remote device. If the candidate devices 206A and 206B determine that they are unable to perform at least one of the service operations (e.g., provide temperature information), then the discovery offloading modules 208C and 208D may determine that the candidate devices 206A and 206B are unable to become an opportunistic service devices and returns to a monitoring mode.

In one or more embodiments, if the discovery offloading modules 208C and 208D determine that the candidate devices 206A and 206B are capable of providing the services, the discovery offloading modules 208C and 208D may also check the availability of the candidate device 206A and 206B. To determine availability, the discovery offloading modules 208C and 208D may determine if enough computing resources (e.g., memory space and processing throughput) are available to process service requests from the client device 202. If the discovery offloading modules 208C and 208D determines that candidate devices 206A and 206B are unavailable to perform at least one of the service operations (e.g., provide temperature information), then the candidate devices 206A and 206B return a monitoring mode to monitor for other offloading alert messages. If the candidate devices 206A and 206B determine that they are both capable and/or available to perform the service, then each of the candidate devices 206A and 206B may advertise their own discovery message indicating that they are available to process the client device's 202 service requests. Having the discovery offloading modules 208C and 208D check for processing availability of the candidate devices 206A and 206B may minimize the need to repeatedly find replacement service devices as well as decreasing the likelihood of resource competition at the candidate devices 206A and 206B.

Step 3 in FIG. 2 involves the client device's 202 discovery offloading module 208A receiving the discovery message advertisements from one or more candidate devices 206A and 206B. Using FIG. 2 as an example, the discovery offloading module 208A may receive discovery message advertisements from one of the candidate device's 206A and 206B or from both the candidate devices' 206A and 206B discovery offloading modules 208C and 208D, respectively. The discovery message advertisements may include an identifier that represents the candidate devices 206A and 206B (e.g., IP address). In situations where the client device 202 receives discovery message advertisements from more than one candidate devices 206A and 206B, the discovery offloading module 208A may select one of the candidate devices 206A and 206B as the opportunistic service device using a variety of well-known methods, such as selecting the opportunistic service device based on the first received discovery message advertisement, a round-robin selection operation, and/or based on the identifier information. For example, the discovery offloading module 208A may select the candidate device 206A and 206B that has the lower IP address. Alternatively, the discovery offloading module 208A may select the candidate device 206A and 206B that has the higher IP address. If the discovery offloading module 208A does not receive discovery message advertisements, the discovery offloading module 208A may continue to monitor for discovery message advertisements until the current service device resumes operations and/or discovery offloading module 208A finds a suitable candidate device 206A and 206B.

Additionally or alternatively, the discovery offloading module 208A may attempt to further minimize the frequency of discovering an opportunistic electronic service device by using contextual information within the discovery message advertisement. Specifically, the discovery message advertisements may include contextual information associated with the advertising candidate device 206A and 206B, such as location information, network conditions, signal strength, and/or computing resource availability. The discovery offloading module 208A may select one of the candidate devices 206A and 206B as the opportunistic service device based on the information within the discovery message advertisements. In one embodiment, the discovery offloading module 208A may use the contextual information to rank and/or prioritize the selection of the candidate devices 206A and 206B. For example, the discovery offloading module 208A may use location information to rank and/or prioritize which candidate device 206A and 206B is closer in proximity to the client device 202. In another embodiment, the discovery offloading module 208A may perform a weighted average that assigns weight values to different contextual parameters in order to select one of the candidate devices 206A and 206B as the opportunistic service device.

Steps 4 and 5 of FIG. 2 involve the client device 202 restarting its tasks related to services previously provided by the current service device 204 and establishing a connection with the opportunistic service device. At step 4, once the client device's 202 discovery offloading module 208A selects an opportunistic service device, the discovery offloading module 208A may trigger the client device 202 to restart host execution instructions for tasks that utilize services previously provided by the current service device 204. In one embodiment, the client device's 202 task model may maintain an execution checkpoint-restart log that identifies a consistent place to resume computing operations that utilize the services. In another embodiment, the client device 202 may have its workload environment in a RESTful state, suggesting that the workload may be consistent immediately once the discovery offloading module 208 triggers the restart. At step 5, the client device 202 opens up a connection with the opportunistic service device to obtain the services.

Figure 3:
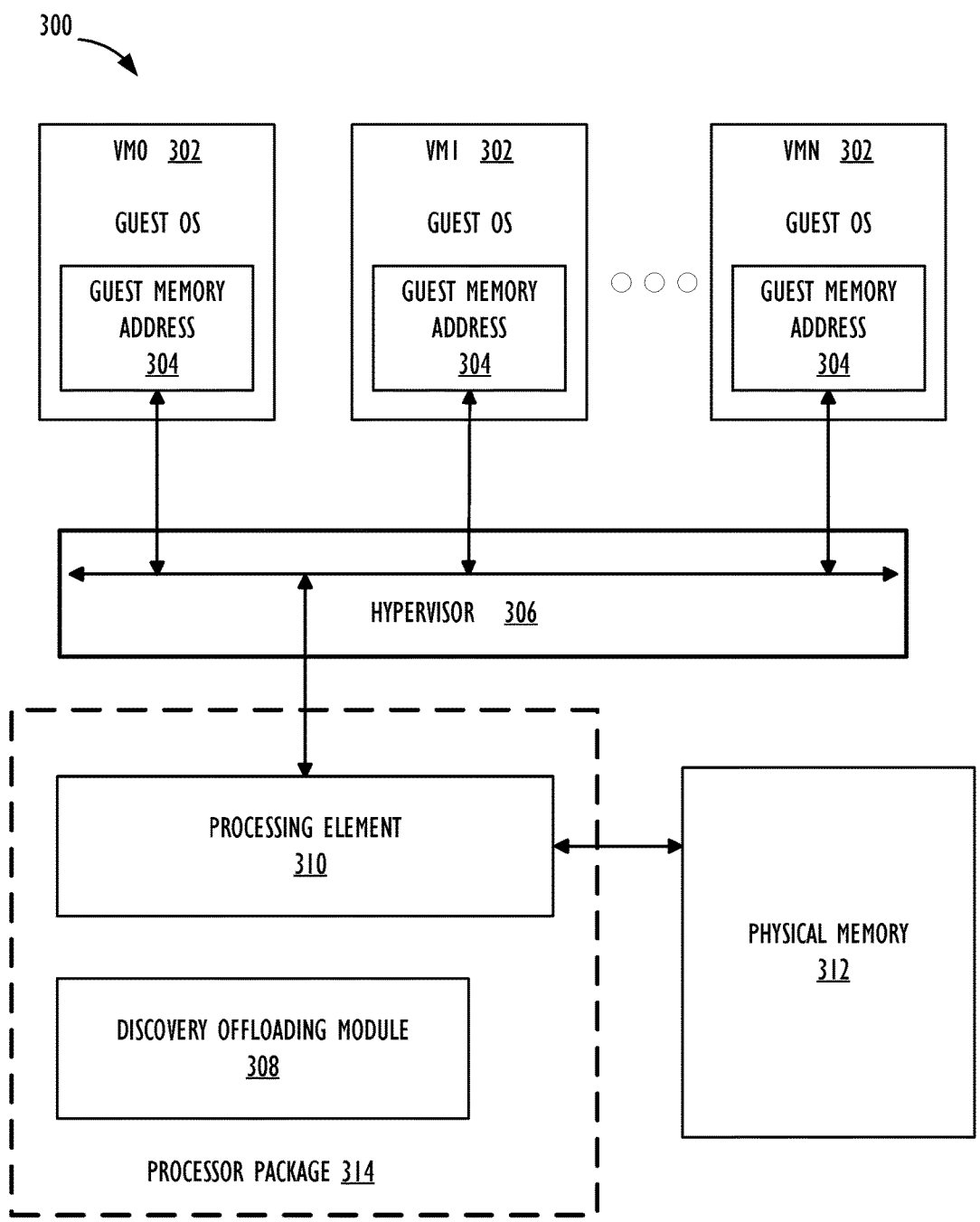
FIG. 3 is a schematic diagram of an embodiment of a computing system architecture for implementing a discovery offloading module.

FIG. 3 is a schematic diagram of an embodiment of a computing system architecture 300 for implementing a discovery offloading module. Using FIG. 1 as an example, the computing system architecture 300 may be found within one or more mobile phone 110, laptop 112, tablet 114, computer servers 104, computers 106, and/or other devices capable of connecting to computer network 102 and/or cellular network 103. Using FIG. 2, as an example, the computing system architecture 300 may implemented within current client devices 202, the current service device 204, and/or the multiple candidate devices 206A and 206B. As shown in FIG. 3, the computing system architecture 300 comprises VMs 0-N 302, where guest operating system (OS) may be installed in each of the VMs 302 and allocated a guest memory address 304. The guest memory address 304 may be a virtual address space that the guest OS presents to computing applications running on the guest OS. In one embodiment, the guest OSs may be OSs installed in addition to the host or main OS of computing system architecture 300. Each of the VMs 302 appear to have its own processor, memory, drivers, and/or other computing resources to execute host computing instructions.

The computing system architecture 300 may also comprise, a hypervisor 306, a processing package 314, and physical memory 312. The hypervisor 302 may be configured to create, run, and manage one or more VMs 302 on computing system architecture 300. Hypervisor 302 may allocate processor, memory, and other computing resources for each of the VMs 302 and prevents the VMs 302 from disrupting each other. The processing package 314 may include a processing element 310 configured to execute one or more host execution instructions and/or other operations relating to performing a host computing related-task, such as host tasks that utilize data from services performed by a current service device 204. The physical memory 312 represents the host's physical memory used to store instructions, code, programs, and/or data information, such as host execution instructions.

FIG. 3 also illustrates that the computer system architecture 300 may comprise a discovery offloading module 308 that is isolated and separated from host execution instructions and host processes performed to run VMs 0-N. FIG. 3 depicts that in order to isolate the discovery offloading module 308 from the host execution instructions, the discovery offloading module 308 is implemented using a separate security and management engine, such as Intel's ME. As a separate security and management engine that could be implemented using hardware, the discovery offloading module 308 may provide additional reliability, robustness, and security. Operating independent of host executed instructions stored within physical memory 312, such as host executed instructions used to operate computing application for VMs 0-N 202, allows the discovery offloading module 308 to be relatively less susceptible to computing failures, malware threats, and/or processing throughput issues that VMs 302, hypervisor 306, and/or processing element 310 may experience. The discovery offloading modules 308 may be able to perform discovery and offloading operations even when one or more of the VMs 302, hypervisor 306, and/or processing element 310 are no longer operational.

The computer system architecture 300 shown in FIG. 3 may be implemented within a current service device, a candidate device, and/or a client device. In embodiments where the computer system architecture 300 is implemented within a current service device, the discovery offloading module 308 may be configured to perform offloading operations by monitoring host execution instructions performed by processing element 310 and/or that are related to one or more VMs 302. Recall that discovery offloading module 308 may also advertise an offloading alert message to one or more client devices and/or candidate devices after detecting offloading conditions. In embodiments where the computer system architecture 300 is found within a candidate device, the discovery offloading module 308 may be configured to receive offloading alert message and determine if the candidate device is capable and/or available to provide the services found within the offloading alert message. If the candidate device is able and/or available to provide the services, the discovery offloading 308 may advertise the discovery message to one or more client devices. In embodiments where the computer system architecture 300 is found within a client device, the discovery offloading module 308 may be configured to receive the offloading alert message, halt host execution instructions and/or trigger the client device to enter an auto-diagnostic mode. When the discovery offloading module 308 receives a discovery message from one or more candidate device, the discovery offloading module 308 may select the opportunistic service device and trigger restarting of executing the host execution instructions.

Although FIG. 3 illustrates a specific embodiment of a computer system architecture 300, the disclosure is not limited to the specific embodiment illustrated FIG. 3. For instance, computer system architecture 300 may also include other types of components, such as sensors (e.g., accelerometer and gyroscope) and/or actuators that are not shown in FIG. 3. In embodiments where the computer system architecture 300 is implemented within a client device with limited computing resources, the present disclosure may not include a hypervisor 306 and/or VMs 302. Instead, the client device may be configured to support a single OS. Additionally, the computer system architecture 300 may implement the discovery offloading module 308 as a secure enclave that occupy private regions of the physical memory 312. The use and discussion of FIG. 3 is only an example to facilitate ease of description and explanation.

Figure 4:
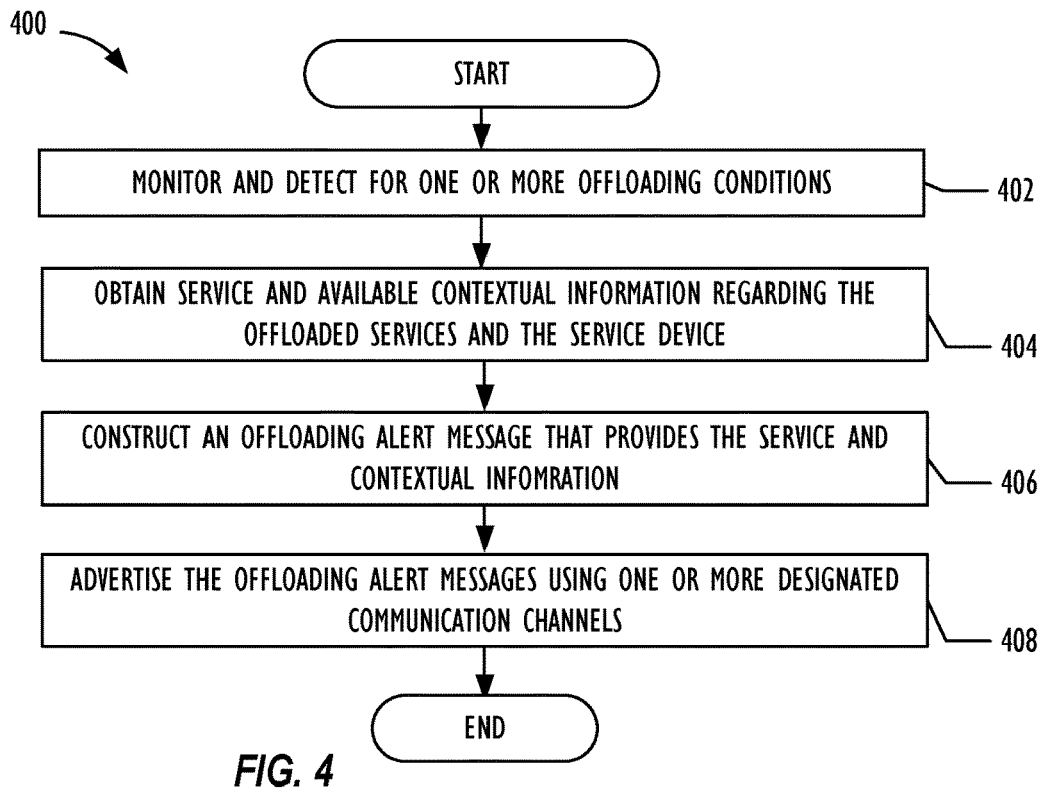
FIG. 4 is a flow chart of an embodiment of a method that dynamically notifies one or more candidate devices and client devices when an offload conditions occurs.

FIG. 4 is a flow chart of an embodiment of a method 400 that dynamically notifies one or more candidate devices and client devices when an offload conditions occurs. Using FIG. 2 as an example, method 400 may be implemented using the current service device 204. In particular, method 400 may be implemented using the discovery offloading module 208B that operates as a dedicated execution environment that isolates itself from the current service device's 204 host execution instructions. Method 400 may perform operations relating to the discovery offloading module 208B using hardware, software, or combination thereof.

Method 400 may start at block 402 to monitor and detect for one or more offloading conditions, which include, but are not limited to as failure, load-balancing, and/or roaming conditions. Method 400 may detect for offloading conditions by analyzing computer events, power supply conditions, computer resource utilization, network conditions, and/or whether the current service device and/or one or more client devices are moving out of communication range. In one embodiment, method 400 may detect an offloading condition when method 400 receives an offloading instruction from another device (e.g., a central entity), which may determine to include more resiliency for a network by allocating more opportunistic devices to perform one or more service operations for one or more client devices.

Method 400 may then move to block 404 and obtain service and available contextual information regarding the offloaded services and the service device. Examples of service and available contextual information method 400 may obtain include, workload information, motion, location, direction, relative position, urgency of the offloading alert message, volume and/or load required to provide the service (e.g., bandwidth, processing capacity, and sensor range), and/or length of time the services may occupy computing resources. Method 400 may then move to block 406 and construct an offloading alert message that provides the service and contextual information obtained at block 404. In one embodiment, method 400 may encode the service and contextual information within the actual alert message. In another embodiment the offloading alert message may include one or more fields that identify the candidate devices and/or references (e.g., memory address index) previously exchanged service and contextual information stored within memory and/or a database. Method 400 may encode pointer information as opposed to encoding the actual service and contextual information when the discovery offloading module are provisioned into an EPID group. Afterwards, method 400 moves to block 408 to advertise (e.g., broadcast or multicast) the offloading alert messages using one or more designated communication channels.

Figure 5:
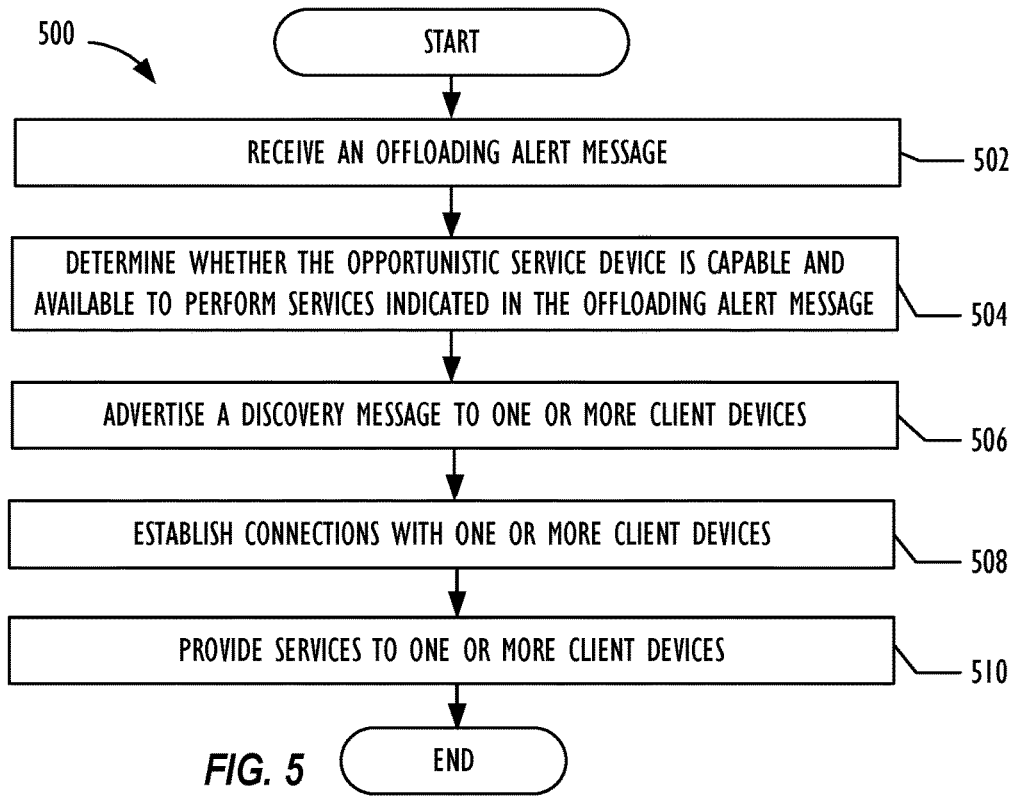
FIG. 5 is a flow chart of an embodiment of a method that dynamically identifies and utilizes a candidate device that is capable and available to replace the current service device.

FIG. 5 is a flow chart of an embodiment of a method 500 that dynamically identifies and utilizes a candidate device that is capable and available to replace the current service device. Using FIG. 2 as an example, method 500 may be implemented using the candidate devices 206A and 206B. In particular, method 500 may be implemented using the discovery offloading modules 208C and 208D that operates as a dedicated execution environment to determine if the associated candidate devices 206A and 206B are suitable to perform the services indicated in the offloading alert message. Method 500 may perform operations relating to the discovery offloading modules 208C and 208D using hardware, software, or combination thereof.

Method 500 may start at block 502 to receive an offloading alert message. After receiving the offloading alert message, method 500 may move to block 504 and determine whether the candidate device is capable and available to perform services indicated in the offloading alert message. Method 500 may determine that the candidate device is capable of performing the services when the candidate device is able to perform all of the service operations. For example, at block 504, method 500 may receive an offloading alert message that the current service device intends to offload location beacon services, providing temperature information from a temperature sensor, and presenting atmospheric pressure data. If at block 504, method 500 determines that the candidate device includes sensors that acquire temperature information and atmospheric pressure, but not location information, method 500 may determine that the candidate device is not able to perform the service operations. Conversely, if the candidate device includes sensors that acquire location information, temperature information, and atmospheric pressure, method 500 may determine that the candidate device is capable of performing the service operations.

Method 500 may also at block 504 determine whether the candidate device is available to perform the services indicated in the offloading alert message. In one embodiment, method 500 may determine availability based on whether the candidate device satisfies volume and load requirements (e.g., bandwidth, processing capacity, and sensor range) to provide the services and/or the length of time the computing resources are going to be in use. At block 504, method 500 may determine the amount computing resources and the allotted time to perform the services using the service and contextual information indicated by the offloading alert message. If the amount of amount computing resources and/or the allotted time perform the services exceeds the candidate device's current computing resources, method 500 may determine that the candidate device is unavailable to perform the services. In one embodiment, the candidate device may be able to offload and/or pass one or more service operations to another device in order to free up computing resources. Method 500, at block 504, may consider the candidate device's to free up computing resources when determining whether the candidate device is available to perform the services.

In another embodiment, at block 504 method 500 may also determine availability based on time limitation or a division of time limitation between the last time the candidate device became an opportunistic service device that provides services to client devices and the time of receiving the offloading alert message. For example, a candidate device may have been recently assigned as an opportunistic service device that provides temperature services to one or more client devices. After receiving the offloading alert message, method 500 may compute the amount of time that has elapsed since the candidate device became an opportunistic service device that provides temperature services and when the candidate device received the offloading alert message. If the elapsed amount of time is less than a time threshold, method 500 may determine that the candidate device is not available to provide the services. If the amount of time lapsed is more than a time threshold, method 500 may determine that the candidate device is available to provide the services.

Method 500 may then move to block 506 to advertise a discovery message to one or more client devices if method 500 determines the candidate device is capable and available to perform services indicated in the offloading alert message. Otherwise, method 500 may continue to monitor for offloading alert messages. At block 506, method 500 may advertise a discovery message that includes an identifier to identify the candidate device (e.g., IP address). Additionally or alternatively, method 500 may attempt to further minimize the frequency of discovering an opportunistic electronic service device by using the contextual information within the discovery message advertisement. The discovery message may include contextual information associated with the advertising candidate device, such as location information, network conditions, signal strength, and/or computing resource availability.

Method 500 may continue to block 508 and establish a connection with one or more client devices. At block 508, method 500 may receive a notification that the client devices have selected the candidate device as an opportunistic service device and/or receive a request from the client devices to establish the connection. Method 500 may then proceed to block 510 and provide services to one or more client devices. When providing services to one or more client devices, method 500 may cancel and/or pass services the candidate device previously performed to another device. Method 500 may also copy the execution instructions and transfer the execution instructions to a replacement device. Method 500 may transfer the execution instructions prior to deleting them in order to free up computing resources for the additional service operations.

Figure 6:
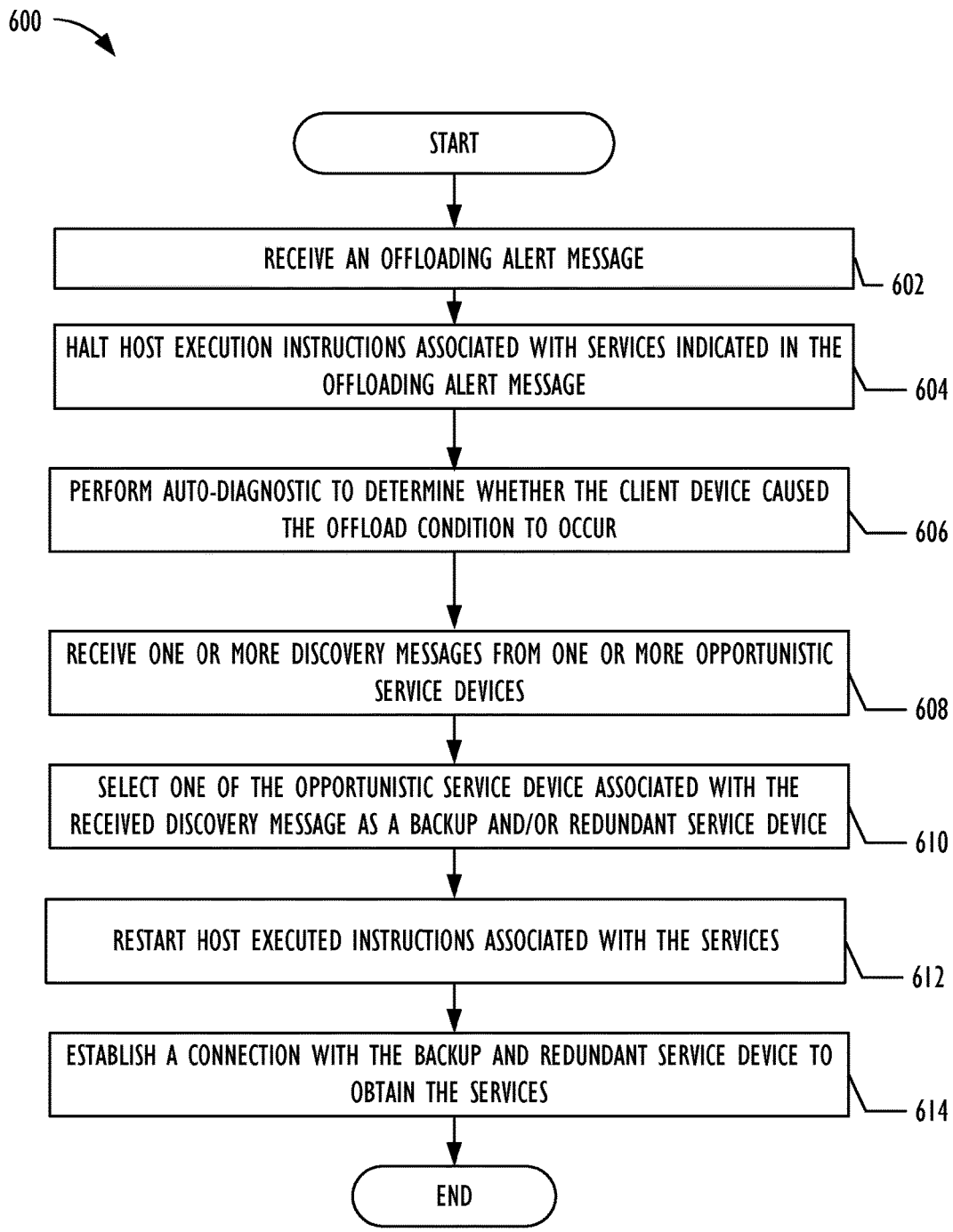
FIG. 6 is a flow chart of an embodiment of a method that dynamically identifies and utilizes opportunistic service devices.

FIG. 6 is a flow chart of an embodiment of a method 600 that dynamically identifies and utilizes opportunistic service devices. Using FIG. 2 as an example, method 600 may be implemented using the client device 202. In particular, method 600 may be implemented using the discovery offloading module 208A that operates as a dedicated execution environment to select candidate devices that transmit discovery messages. Method 600 may perform operations relating to the discovery offloading module 208A using hardware, software, or combination thereof.

Method 600 may start at block 602 to receive an offloading alert message. After receiving the offloading alert message, method 600 may move to block 604 and halt host operations associated with services indicated in the offloading alert message. Method 600 may also simultaneously and/or afterwards move to block 606 that performs auto-diagnostic to determine whether the client device caused the offload condition that generated the offloading alert message. For example, at block 606, method 600 may determine whether the client device has one or more failing components, and/or if the client devices have roamed out of range of the current service device.

Method 600 may then receive one or more discovery messages from one or more candidate devices at block 608. The discovery messages may have the format as discussed in block 506 of method 500. Method 600 may then select one of the candidate devices associated with the received discovery message as an opportunistic service device at block 610. Method 600 may use a variety of selection methods to select an opportunistic service device. Examples include selecting the first received discovery message, a round-robin selection operation, selection based on the identifier information, ranking and prioritizing candidate devices based on information within the discovery message, and/or performing a weighted computation.

After selecting the opportunistic service device, method 600 may continue to block 612 and restart host executed instructions associated with the services. In one embodiment, method 600 may maintain an execution checkpoint-restart log that identifies a consistent place to resume computing operations that utilize the services. In another embodiment, the method 600 may be have its workload environment in a RESTful state, suggesting that the workload may be consistent immediately once the method 600 restarts the host executed instructions. At block 614, method 600 establishes a connection with the opportunistic service device to obtain the services.

Figure 7:
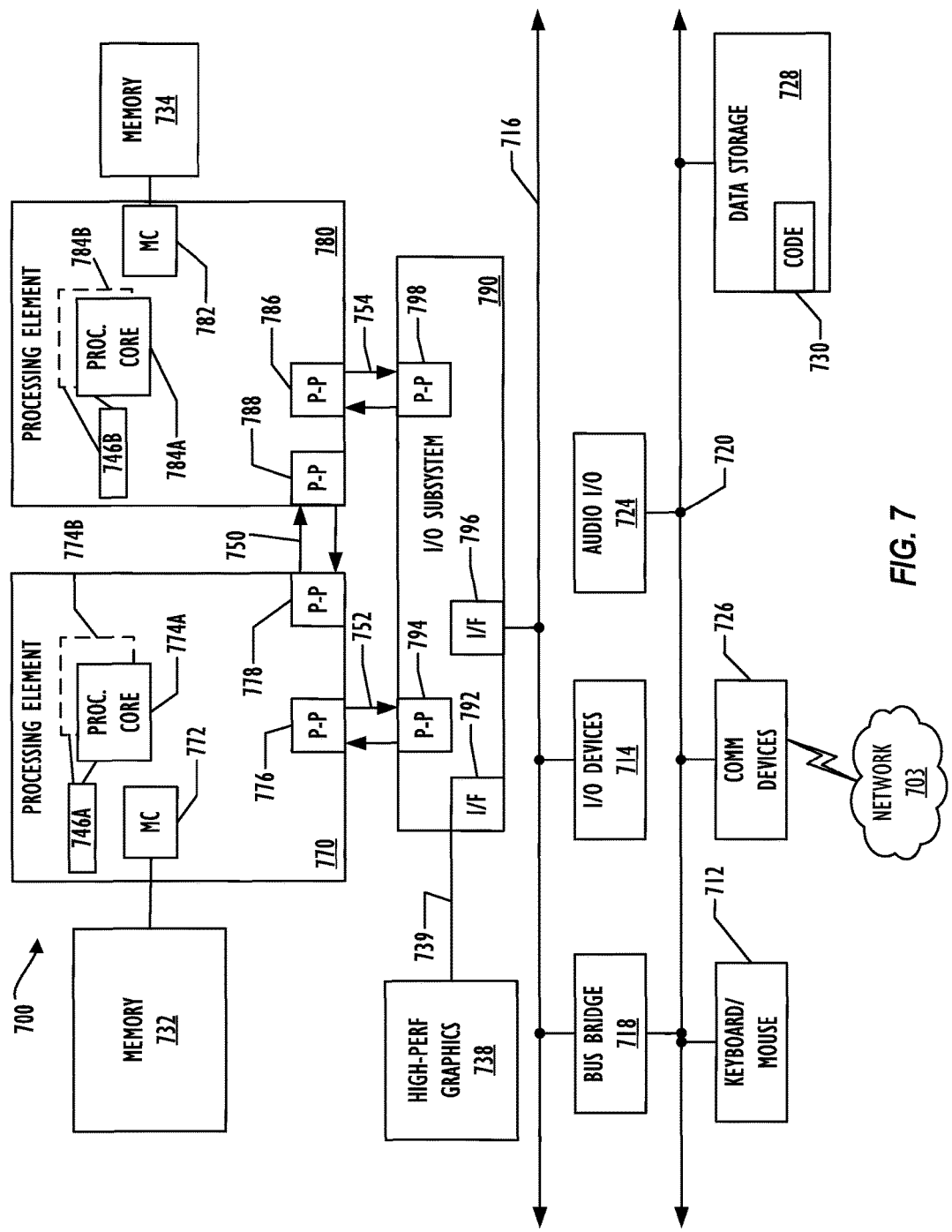
FIG. 7 is a block diagram illustrating an embodiment of a computing device for use with techniques described herein.

Referring now to FIG. 7, a block diagram illustrates a programmable device 700 that may be used for implementing the techniques described herein in accordance with one or more embodiments (e.g., computing system architecture 300 and methods 400, 500, and 600). The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774*a* and 774*b* and processor cores 784*a* and 784*b*). Such cores 774*a*, 774*b*, 784*a*, 784*b* may be configured to execute computing instruction code. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746*a*, 746*b* may store data (e.g., computing instructions) that are utilized by one or more components of the processing element, such as the cores 774*a*, 774*b* and 784*a*, 784*b*, respectively. For example, the shared cache may locally cache data stored in a memory 732, 734 for faster access by components of the processing elements 770, 780. In one or more embodiments, the shared cache 746*a*, 746*b* may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to first link 716, along with a bridge 718 that may couple first link 716 to a second link 720. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
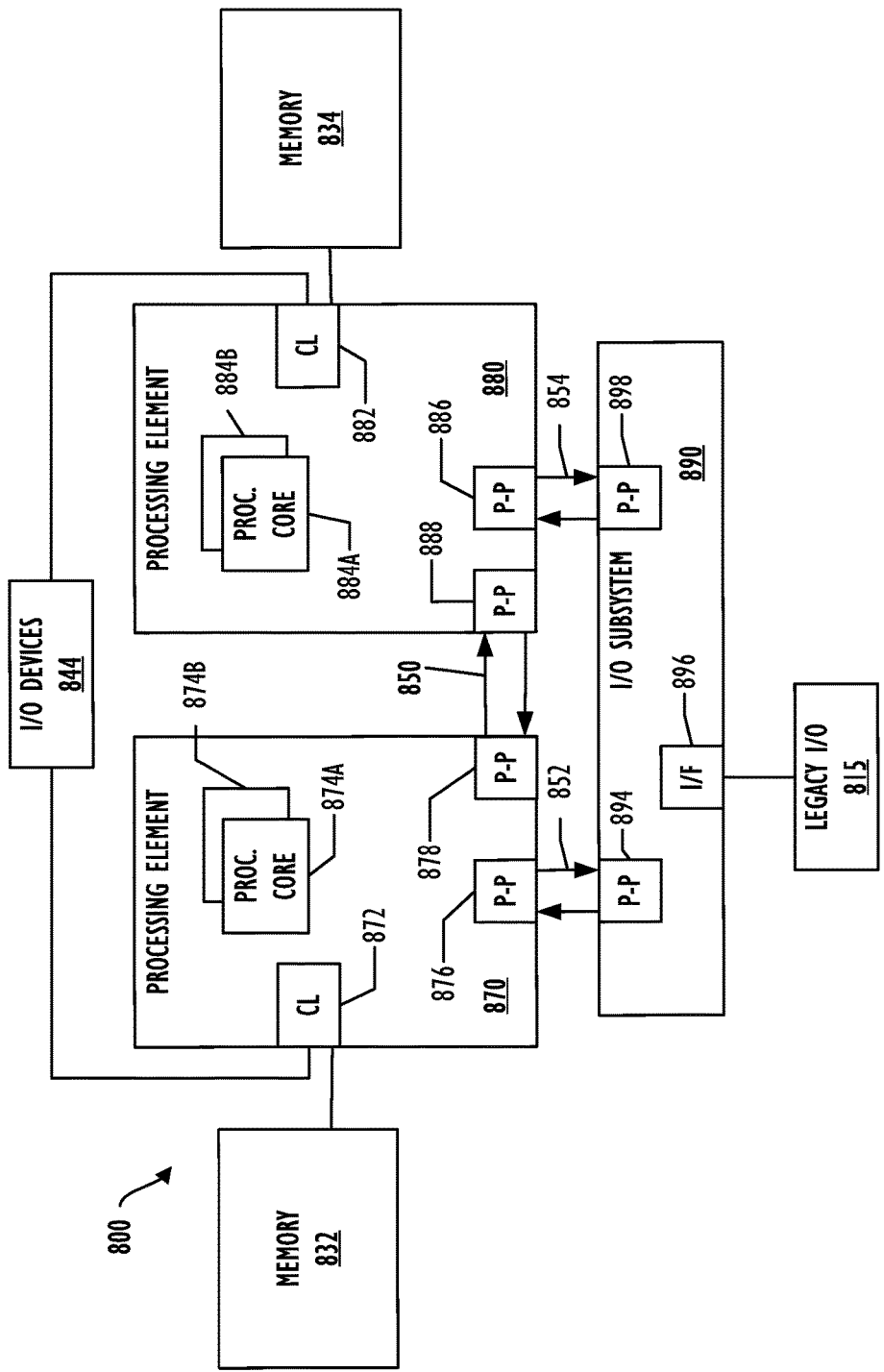
FIG. 8 is a block diagram illustrating another embodiment of computing device for use with techniques described herein.

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 8. In addition, CL 872, 882 may also include I/O control logic. FIG. 8 illustrates that not only may the memories 832, 834 be coupled to the CL 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions that when executed cause a machine to: receive, in a dedicated execution environment within a client device, an offloading alert message from a service device, wherein the offloading alert message indicates the service device is unable to provide one or more services to the client device, receive, in the dedicated execution environment, a discovery message from a candidate device, wherein the discovery message indicates the candidate device is capable of performing the services provided to the client device, select, with the dedicated execution environment, an opportunistic service device based on the discovery message from the candidate device, and trigger, with the dedicated execution environment, a restart of host execution instructions within the client device by obtaining the one or more services from the opportunistic service device, wherein the dedicated execution environment is isolated from the host execution instructions within the client device.

In Example 2, the subject matter of Example 1 can optionally include instructions, when executed, cause the machine to trigger, with the dedicated execution environment, halting the host execution instructions associated with the one or more services indicated in the offloading alert message.

In Example 3, the subject matter of Examples 1 or 2 can optionally include instructions, when executed, causes the machine to transition, with the dedicated execution environment, the client device into an auto-diagnostic mode.

In Example 4, the subject matter of Example 3 can optionally include that the auto-diagnostic mode determines whether a failure occurs at the client device.

In Example 5, the subject matter of any preceding Examples can optionally include that the dedicated execution environment is implemented within one or more secure enclaves of a memory of the client device.

In Example 6, the subject matter of any of the Examples 1-4 can optionally include that the dedicated execution environment is a trusted execution environment.

In Example 7, the subject matter of any preceding Examples can optionally include that the offloading alert message comprises contextual information relating to the services provided to the client device.

In Example 8, the subject matter of any preceding Examples can optionally include that the discovery message further indicates the candidate device is available to perform the services provided to the client device.

In Example 9, the subject matter of any of the Examples 1-4, 7, and 8 can optionally include that the dedicated execution environment is implemented within a security and management engine.

In Example 10, the subject matter of any preceding Examples can optionally include that the dedicated execution environment is provisioned into a group that authenticates group members with one or more security credentials.

In Example 11, the subject matter of Example 10 can optionally include that the group is an EPID group.

Example 12 includes a client device for offloading computing services, comprising: a discovery offloading module configured to: receive an offloading alert message from a service device, wherein the offloading alert message indicates the service device is unable to provide one or more services to the client device, receive a discovery message from a candidate device in a dedicated execution environment, wherein the discovery message indicates the candidate device is capable of performing the services provided to the client device, select, using the dedicated execution environment, an opportunistic service device based on the discovery message from the candidate device, and trigger a restart of a host execution instruction within the client device by obtaining the one or more services from the opportunistic service device, wherein the discovery offloading module operates independently from the host execution instructions within the client device.

In Example 13, the subject matter of Example 12 can optionally include that the discovery offloading module is further configured to trigger halting of the host execution instructions associated with the one or more services indicated in the offloading alert message.

In Example 14, the subject matter of Examples 12 or 13 can optionally include that the discovery offloading module is further configured to cause transition of the client device into an auto-diagnostic mode.

In Example 15, the subject matter of Example 14 can optionally include that the discovery offloading module comprises execution instructions within secure enclaves of a memory of the client device.

In Example 16, the subject matter of any of the Examples 12-15 can optionally include that the discovery offloading module is provisioned into a group that authenticates group members with one or more security credentials.

In Example 17, the subject matter of any of the Examples 12-16 can optionally include that the offloading alert message comprises contextual information relating to the services provided to the client device.

Example 18 includes a method for offloading computing services, comprising: receiving, using a dedicated execution environment within a client device, an offloading alert message from a service device, wherein the offloading alert message indicates the service device is unable to provide one or more services to the client device, receiving, using the dedicated execution environment, a discovery message from a candidate device, wherein the discovery message indicates the candidate device is capable of performing the services provided to the client device, selecting, using the dedicated execution environment, an opportunistic service device based on the discovery message from the candidate device, and triggering, using the dedicated execution environment, a restart of a host execution instruction within the client device by obtaining the one or more services from the opportunistic service device, wherein the dedicated execution environment is isolated from the host execution instructions within the client device.

In Example 19, the subject matter of Example 18 can optionally include halting, using the dedicated execution environment, host execution instructions associated with the one or more services indicated in the offloading alert message.

In Example 20, the subject matter of Examples 18 or 19 can optionally include transitioning, using the dedicated execution environment, the client device into an auto-diagnostic mode.

In Example 21, the subject matter of any of the Examples 18-20 can optionally include that the dedicated execution environment is implemented within a security and management engine.

In Example 22, the subject matter of any of the Examples 18-21 can optionally include that the dedicated execution environment is provisioned into a group that authenticates group members with one or more security credentials.

Example 23 includes a service device for offloading computing services, comprising: a discovery offloading module configured to: detect for occurrences of one or more offloading conditions corresponding to service operations provided to one or more client devices, obtain service and contextual information regarding the corresponding service operations, construct an offloading alert message that indicates the service device is unable to perform the service operations, and advertise the offloading alert message to the one or more client devices, wherein the discovery offloading module operates independently of host execution instructions that provide the service operations.

In Example 24, the subject matter of Example 23 can optionally include that the discovery offloading module configured to detect the occurrences of one or more offloading condition by detecting a service device failure.

In Example 25, the subject matter of Examples 23 or 24 can optionally include that the service and contextual information includes location, motion, direction, and relative position of the service device.

Example 26 includes a system for offloading computing services comprising: at least one processor; and at least one memory, coupled to the at least one processor, and comprises instructions, when executed by the at least one processor, causes the system to perform the steps of the machine readable medium of any one of the Examples 1-11.

Example 27 includes a client device for offloading computing services, comprising means to perform the steps of the machine readable medium of any one of the Examples 1-11.

Example 28 includes a method for offloading computing services that performs the steps of the service device of any one of the Examples 23-25.

Example 29 includes a service device for offloading computing services comprising means to perform the steps of the service device of any one of the Examples 23-25.

Example 30 includes a system for offloading computing services comprising: at least one processor; and at least one memory, coupled to the at least one processor, and comprises instructions, when executed by the at least one processor, causes the system to perform the steps of the service device of any one of the Examples 23-25.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A storage device or storage disk comprising instructions that when executed cause a client device with a dedicated execution environment to at least:

responsive to an offloading alert message (i) indicating that a first service device is unable to provide one or more services to the client device and (ii) including contextual information from the offloading alert message relating to the one or more services being provided by the first service device to the client device, select a candidate device as an opportunistic service device based on a discovery message from the candidate device, the discovery message to indicate the candidate device is available to perform the one or more services for the client device based on the contextual information;

trigger halting of host execution instructions associated with the one or more services to be provided by the first service device indicated in the offloading alert message; and trigger a restart of the host execution instructions by obtaining the one or more services from the opportunistic service device, the host execution instructions to execute on the client device in isolation from the dedicated execution environment, the dedicated execution environment provisioned into an enhanced privacy identifier (EPID) group that authenticates group members with one or more security credentials.

2. The storage device or storage disk of claim 1, wherein the instructions, when executed, cause the client device to transition the client device into an auto-diagnostic mode.

3. The storage device or storage disk of claim 2, wherein the auto-diagnostic mode is to determine whether a failure has occurred at the client device.

4. The storage device or storage disk of claim 1, wherein the instructions, when executed, cause the client device to implement the dedicated execution environment within one or more secure enclaves of a memory of the client device.

5. The storage device or storage disk of claim 1, wherein the instructions, when executed, cause the client device to implement the dedicated execution environment as a trusted execution environment.

6. The storage device or storage disk of claim 1, wherein the instructions, when executed, cause the client device to implement the dedicated execution environment within a security and management engine.

7. A client device for offloading computing services, comprising:

a memory; and a processor to at least:

responsive to an offloading alert message (i) indicating that a first service device is unable to provide one or more services to the client device and (ii) including contextual information from the offloading alert message relating to the one or more services being provided by the first service device to the client device, select a candidate device as an opportunistic service device based on a discovery message from the candidate device, the discovery message to indicate the candidate device is available to perform the one or more services for the client device based on the contextual information;

trigger halting of a host execution instruction associated with the one or more services indicated in the offloading alert message; and trigger a restart of the host execution instruction by obtaining the one or more services from the opportunistic service device, the host execution instruction to execute independent of a dedicated execution environment in which the processor is to operate on the client device, the dedicated execution environment provisioned into an enhanced privacy identifier (EPID) group that authenticates group members with one or more security credentials.

8. The client device of claim 7, wherein the processor is to cause transition of the client device into an auto-diagnostic mode.

9. The client device of claim 8, wherein the is to execute execution instructions within secure enclaves of the memory of the client device.

10. A method for offloading computing services, comprising:
responsive to an offloading alert message (i) indicating that a first service device is unable to provide one or more services to the client device and (ii) including contextual information from the offloading alert message relating to the one or more services being provided by the first service device to the client device, selecting a candidate device as an opportunistic service device based on a discovery message from the candidate device, the discovery message to indicate the candidate device is available to perform the one or more services for the client device based on the contextual information;
triggering a halting of a host execution instruction associated with the one or more services to be provided by the first service device indicated in the offloading alert message; and
triggering, by executing an instruction in a dedicated execution environment, a restart of the host execution instruction by obtaining the one or more services from the opportunistic service device,
the host execution instruction to execute on the client device in isolation from the dedicated execution environment, the dedicated execution environment provisioned into an enhanced privacy identifier (EPID) group that authenticates group members with one or more security credentials.

11. The method of claim 10, further including transitioning, by executing an instruction in the dedicated execution environment, the client device into an auto-diagnostic mode.

12. The method of claim 10, wherein the dedicated execution environment is implemented within a security and management engine.

13. A service device for offloading computing services, the service device comprising:
a memory; and
a processor to at least:
detect occurrences of one or more offloading conditions corresponding to service operations provided to one or more client devices;
obtain service and contextual information regarding the corresponding service operations;
construct an offloading alert message, based on the service and contextual information, that indicates the service device is unable to perform the service operations; and
advertise the offloading alert message to the one or more client devices and one or more candidate devices to determine an availability of the one or more candidate devices to perform the one or more services for the client device based on the contextual information,
the processor to operate in a dedicated execution environment independent of host execution instructions that provide the service operations, the dedicated execution environment provisioned into an enhanced privacy identifier (EPID) group that authenticates group members with one or more security credentials.

14. The service device of claim 13, wherein the discovery offloading module is configured to detect the occurrences of one or more offloading condition by detecting a service device failure.

15. The service device of claim 13, wherein the service and contextual information includes location, motion, direction, and relative position of the service device.

16. A storage device or storage disk comprising instructions that when executed cause a client device with a dedicated execution environment to at least:
responsive to an offloading alert message (i) indicating that a first service device is unable to provide one or more services to the client device and (ii) including contextual information from the offloading alert message relating to the one or more services being provided by the first service device to the client device, trigger an auto-diagnostic mode to determine whether a failure has occurred at the client device and select a candidate device as an opportunistic service device based on a discovery message from the candidate device, the discovery message to indicate the candidate device is available to perform the one or more services for the client device based on the contextual information;
trigger halting of host execution instructions associated with the one or more services to be provided by the first service device indicated in the offloading alert message; and
trigger a restart of the host execution instructions by obtaining the one or more services from the opportunistic service device, the host execution instructions to execute on the client device in isolation from the dedicated execution environment.

17. A method for offloading computing services, comprising:
responsive to an offloading alert message (i) indicating that a first service device is unable to provide one or more services to the client device and (ii) including contextual information from the offloading alert message relating to the one or more services being provided by the first service device to the client device, triggering an auto-diagnostic mode to determine whether a failure has occurred at the client device and selecting a candidate device as an opportunistic service device based on a discovery message from the candidate device, the discovery message to indicate the candidate device is available to perform the one or more services for the client device based on the contextual information;
triggering a halting of a host execution instruction associated with the one or more services to be provided by the first service device indicated in the offloading alert message; and
triggering, by executing an instruction in a dedicated execution environment, a restart of the host execution instruction by obtaining the one or more services from the opportunistic service device,
the host execution instruction to execute on the client device in isolation from the dedicated execution environment.

* * * * *